United States Patent
Sadiq et al.

(10) Patent No.: US 10,939,401 B2
(45) Date of Patent: Mar. 2, 2021

(54) ROUND TRIP TIME ESTIMATION BASED ON A TIMING ADVANCE APPLIED TO A TIMING RESPONSE

(71) Applicant: QUALCOMM Incorporated, San Diego, CA (US)

(72) Inventors: Bilal Sadiq, Basking Ridge, NJ (US); Navid Abedini, Somerset, NJ (US); Naga Bhushan, San Diego, CA (US); Junyi Li, Chester, NJ (US); Joseph Binamira Soriaga, San Diego, CA (US); Muhammad Nazmul Islam, Littleton, MA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/450,512

(22) Filed: Jun. 24, 2019

(65) Prior Publication Data

US 2020/0015185 A1   Jan. 9, 2020

(30) Foreign Application Priority Data

Jul. 9, 2018   (GR) .............................. 20180100305

(51) Int. Cl.
*H04W 56/00* (2009.01)
*H04W 24/10* (2009.01)
*H04L 5/00* (2006.01)

(52) U.S. Cl.
CPC ....... *H04W 56/0045* (2013.01); *H04L 5/0051* (2013.01); *H04W 24/10* (2013.01); *H04W 56/009* (2013.01)

(58) Field of Classification Search
CPC ..... H04L 1/205; H04L 5/0051; H04L 7/0033; H04L 7/0037; H04L 43/0864;
(Continued)

(56) References Cited

U.S. PATENT DOCUMENTS 10,477,494 B2* 11/2019 Jung ..................... H04W 48/20
2013/0121173 A1   5/2013 Chen et al.
2019/0306821 A1* 10/2019 Hu .................... H04W 56/0065

FOREIGN PATENT DOCUMENTS

| JP | 2008267973 A | 11/2008 |
|---|---|---|
| WO | 9917481 A1 | 4/1999 |
| WO | 2008017033 A2 | 2/2008 |

OTHER PUBLICATIONS

International Search Report and Written Opinion—PCT/US2019/039032—ISA/EPO—dated Oct. 9, 2019.

* cited by examiner

*Primary Examiner* — Kan Yuen
(74) *Attorney, Agent, or Firm* — MG-IP Law, P.C.

(57) ABSTRACT

Systems and methods for determining round trip time (RTT) includes a second node, which receives a first signal from a first node at a first time, determines a timing advance based on a first estimated channel response for the first signal, and transmits at a second time, a second signal to the first node, wherein the second time occurs after the first time by an amount of a pre-specified delay for RTT estimation minus the timing advance. The first node transmits the first signal to the second node at an initial time, receives the second signal from the second node, and determines a timing statistic from a second estimated channel response for the second signal, the timing statistic estimated at a third time. The first node determines the RTT as the third time minus the initial time minus the pre-specified delay for RTT estimation.

15 Claims, 8 Drawing Sheets

(58) Field of Classification Search
CPC ..... H04L 43/087; H04L 47/28; H04L 47/283; H04L 47/32; H04W 24/10; H04W 56/0045; H04W 56/0055; H04W 56/0065; H04W 64/00; H04W 64/003; H04W 56/009; H04B 17/00; H04B 17/27
See application file for complete search history.

ROUND TRIP TIME ESTIMATION BASED ON A TIMING ADVANCE APPLIED TO A TIMING RESPONSE

CROSS-REFERENCE TO RELATED APPLICATION

The present Application for Patent claims priority under 35 U.S.C. § 119 to Greek Patent Application No. 20180100305, entitled "ROUND TRIP TIME (RTT) ESTIMATION BASED ON A TIMING ADVANCE APPLIED TO A TIMING RESPONSE," filed Jul. 9, 2018, assigned to the assignee hereof, and expressly incorporated herein by reference in its entirety.

TECHNICAL FIELD

Disclosed aspects are generally directed to round trip time (RTT) estimation between two nodes. For example, exemplary aspects are directed to a timing advance applied to the transmission of a timing response signal used in estimating RTT.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, there is a need to significantly enhance the spectral efficiency of 5G mobile communications, compared to the current 4G standard. Furthermore, there is also a concomitant need to enhance signaling efficiencies and substantially reduce latency, compared to current standards.

Some applications of wireless communications involve the determination of a RTT of a wireless signal's propagation between two communication nodes. For example, applications such as ranging, positioning, etc., of a mobile device (also referred to as a user equipment or "UE") may involve the measurement of a wireless signal's propagation time between the UE and a fixed reference node (e.g., a base station at a known location), where "ranging" refers to the determination of the distance between a UE and the fixed reference node. The UE may engage in N ranging procedures with N fixed reference nodes to determine N associated UE-to-node distances, which may then be used to determine or refine a positioning estimate for the UE. Improving the accuracy of ranging and positioning is seen to be an important goal. For example, for vehicle-integrated UEs, accurate ranging and positioning may be critical for collision avoidance and autonomous driving; for pedestrian UEs, accurate ranging and positioning are seen to be useful for road safety and urban navigation, etc.

Since an accurate determination of the RTT between a UE and a fixed reference node plays an integral role in improving ranging and positioning accuracy, there is a corresponding need for improving the RTT determination in wireless communication systems.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of determining an RTT between two nodes includes receiving, by a second node, a first signal from a first node at a first time, determining, by the second node, a timing advance based on a first estimated channel response for the first signal, wherein the timing advance comprises a difference between the first time and a timing statistic of the first signal determined from the first estimated channel response, and transmitting, by the second node, at a second time, a second signal to the first node, wherein the first signal and the second signal are for determining RTT between the first node and the second node, and wherein the second time occurs after the first time by an amount of a pre-specified delay for RTT estimation minus the timing advance.

In an aspect, a method of determining an RTT between two nodes includes transmitting, by a first node, a first signal to a second node at an initial time, receiving, at the first node, a second signal, in response to transmission of the first signal, from the second node, wherein the first signal and the second signal are for determining RTT between the first node and the second node, determining, at the first node, a timing statistic from a second estimated channel response for the second signal, wherein the timing statistic occurs at a third time, and wherein the third time is after a time of arrival (ToA) of the second signal, and determining the RTT between the first node and the second node as the third time minus the initial time minus a pre-specified delay for RTT estimation.

In an aspect, an apparatus for determining an RTT between two nodes includes transceiver circuitry of a second node configured to receive a first signal from a first node at a first time, and processor circuitry of the second node in communication with the transceiver circuitry, wherein the processor circuitry is configured to determine a timing advance based on a first estimated channel response for the first signal, wherein the timing advance comprises a difference between the first time and a timing statistic of the first signal determined from the first estimated channel response, and cause the transceiver to transmit, at a second time, a second signal to the first node, wherein the first signal and the second signal are for determining RTT between the first node and the second node, and wherein the second time occurs after the first time by an amount of a pre-specified delay for RTT estimation minus the timing advance.

In an aspect, an apparatus for determining an RTT between two nodes includes transceiver circuitry of a first node configured to transmit a first signal to a second node at an initial time and to receive a second signal, in response to transmission of the first signal, from the second node, wherein the first signal and the second signal are for determining RTT between the first node and the second node, and processor circuitry of the first node in communication with the transceiver circuitry, wherein the processor circuitry is configured to determine a timing statistic from a second estimated channel response for the second signal, wherein the timing statistic occurs at a third time, and wherein the third time is after a time of arrival (ToA) of the second signal, and determine the RTT between the first node and the second node as the third time minus the initial time minus a pre-specified delay for RTT estimation.

In an aspect, an apparatus for determining an RTT between two nodes includes means for communicating of a second node configured to receive a first signal from a first node at a first time, and means for processing of the second node configured to determine a timing advance based on a first estimated channel response for the first signal, wherein the timing advance comprises a difference between the first time and a timing statistic of the first signal determined from the first estimated channel response, and cause the means for communicating to transmit, at a second time, a second signal to the first node, wherein the first signal and the second signal are for determining RTT between the first node and the second node, and wherein the second time occurs after the first time by an amount of a pre-specified delay for RTT estimation minus the timing advance.

In an aspect, an apparatus for determining an RTT between two nodes includes means for communicating of a first node configured to: transmit a first signal to a second node at an initial time, and receive a second signal, in response to transmission of the first signal, from the second node, wherein the first signal and the second signal are for determining RTT between the first node and the second node, and means for processing of the first node configured to: determine a timing statistic from a second estimated channel response for the second signal, wherein the timing statistic occurs at a third time, and wherein the third time is after a time of arrival (ToA) of the second signal, and determine the RTT between the first node and the second node as the third time minus the initial time minus a pre-specified delay for RTT estimation.

In an aspect, a non-transitory computer-readable storage medium comprises code, which, when executed by a second node, causes the second node to perform operations for determining an RTT between two nodes. The non-transitory computer-readable storage medium includes code for receiving a first signal from a first node at a first time, code for determining a timing advance based on a first estimated channel response for the first signal, wherein the timing advance comprises a difference between the first time and a timing statistic of the first signal determined from the first estimated channel response, and code for transmitting, at a second time, a second signal to the first node, wherein the first signal and the second signal are for determining RTT between the first node and the second node, and wherein the second time occurs after the first time by an amount of a pre-specified delay for RTT estimation minus the timing advance.

In an aspect, a non-transitory computer-readable storage medium comprises code, which, when executed by a first node, causes the first node to perform operations for determining an RTT between two nodes. The non-transitory computer-readable storage medium includes code for transmitting a first signal to a second node at an initial time, code for receiving a second signal, in response to transmission of the first signal, from the second node, wherein the first signal and the second signal are for determining RTT between the first node and the second node, code for determining a timing statistic from a second estimated channel response for the second signal, wherein the timing statistic occurs at a third time, and wherein the third time is after a time of arrival (ToA) of the second signal, and code for determining the RTT between the first node and the second node as the third time minus the initial time minus a pre-specified delay for RTT estimation.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
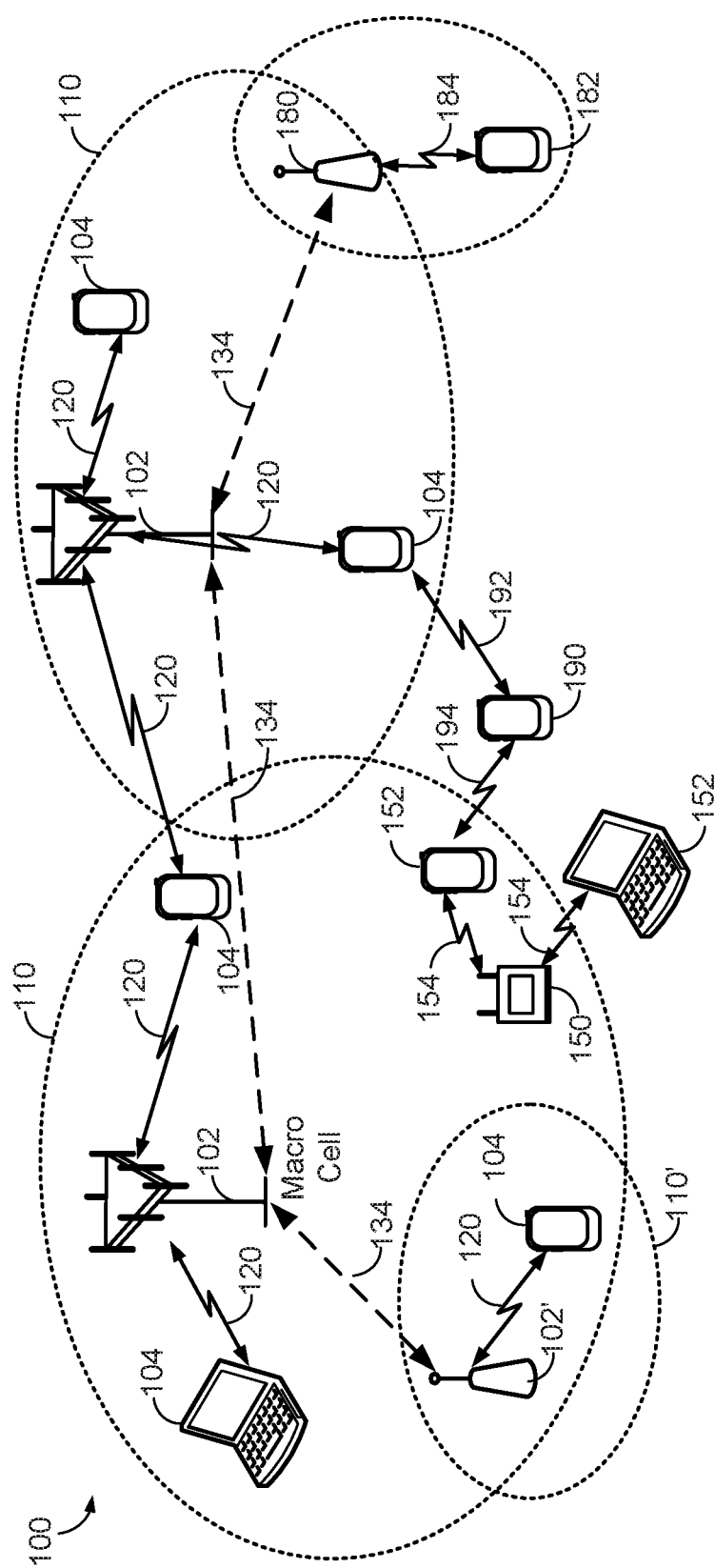
FIG. 1 illustrates an exemplary wireless communications system, according to various aspects.

Aspects disclosed herein are directed to determining and applying a timing advance to a timing response transition for RTT estimation. These and other aspects are disclosed in the following description and related drawings to show specific examples relating to exemplary aspects. Alternative aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network, the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include roadside units (RSUs), femtocells, picocells, microcells, etc.

The base stations 102 may collectively form a RAN and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire®.

Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The wireless communications system 100 may further include a mmW base station 180 that may operate in mmW frequencies and/or near mmW frequencies in communication with a UE 182. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connect indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth®, and so on.

Referring to FIG. 1, some or all of the base stations 102 and/or 180, the WLAN AP 150 may be operable as fixed reference nodes having known locations (e.g., accurate predetermined positions) for use in conjunction with RTT ranging procedures with mobile nodes or UEs. Moreover, certain UEs may also at least temporarily be operable as fixed reference nodes. For example, in addition to permanently installed network RSUs, a vehicle-integrated UE may function as an RSU when the vehicle is engaged in a parked state. In this case, the vehicle-integrated UE in the parked vehicle may be available for use as a fixed reference node in association with RTT ranging procedures with mobile nodes or UEs until the vehicle begins driving again. Thus, while in some examples herein, RTT estimation may be described with respect to the RTT of a signal transmitted from a base station 102 to travel to a UE 104 and return to the base station 102, it will be understood that the aspects herein are generally applicable for RTT estimation of signals between any two nodes without limitation on which node the signals originate from or are received by.

Figure 2A:
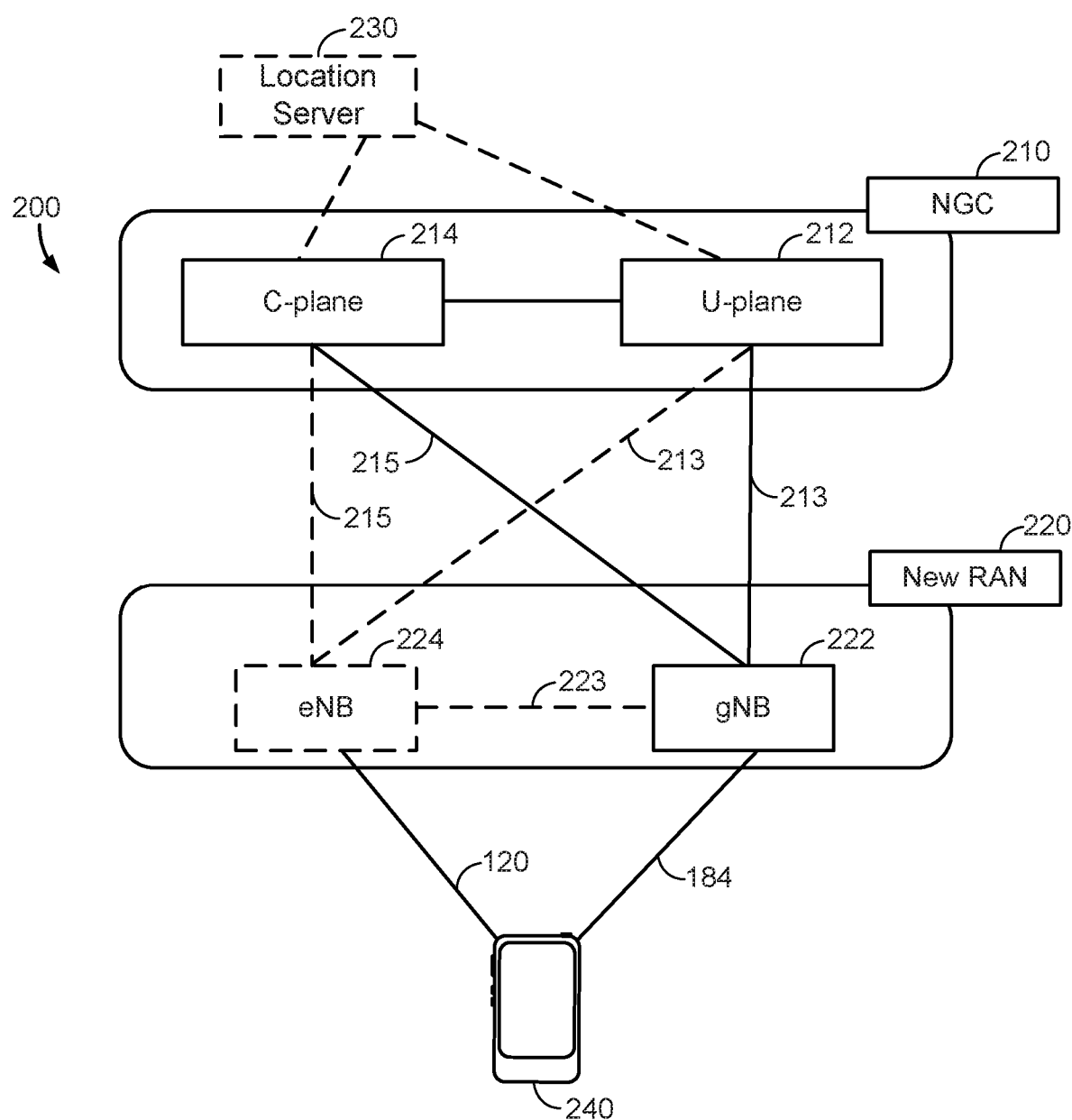
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with one or more UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
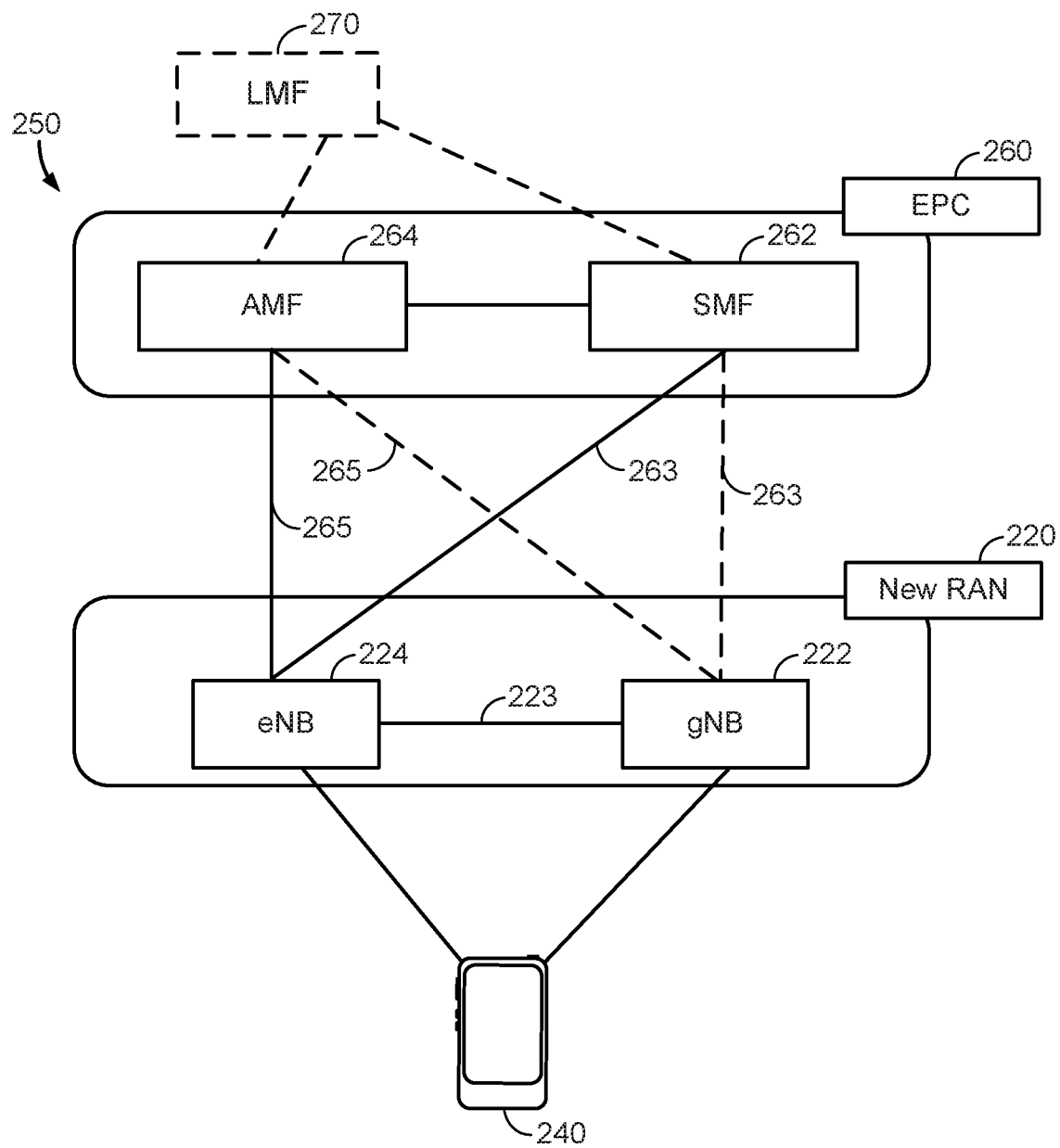

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3:
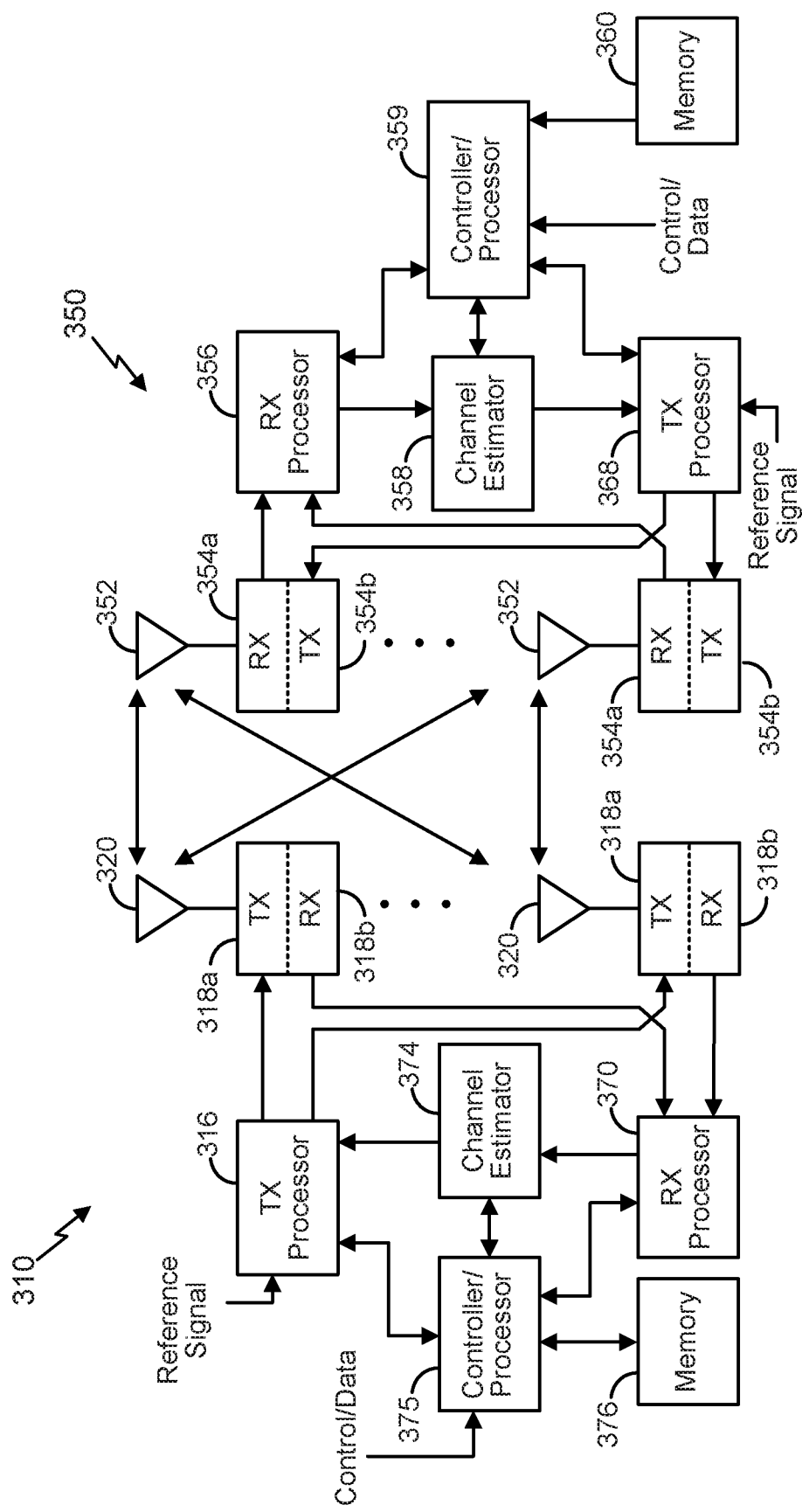
FIG. 3 illustrates an exemplary base station and an exemplary UE in an access network, according to various aspects.

According to various aspects, FIG. 3 illustrates an exemplary base station 310 (e.g., an eNB, a gNB, a small cell base station, a WLAN AP, a fixed reference node, an RSU, etc.) in communication with an exemplary UE 350 (e.g., any of the UEs described above, a vehicle-integrated UE, a pedestrian UE or UE that is operated by a human independently of a vehicle, etc.) in a wireless network. In the DL, IP packets from the core network (NGC 210/EPC 260) may be provided to a controller/processor 375. The controller/processor 375 may implement functionality for a radio resource control (RRC) layer, a packet data convergence protocol (PDCP) layer, a radio link control (RLC) layer, and a medium access control (MAC) layer. The controller/processor 375 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., a pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 may then convert the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions may then be decoded and de-interleaved to recover the data and control signals that were originally transmitted by the base station 310 on the physical channel. The data and control signals may then be provided to the controller/processor 359, which may implement Layer-3 and Layer-2 functionality.

The controller/processor 359 can be associated with a memory 360 that stores program codes and data. The memory 360 may be referred to as a non-transitory computer-readable medium. In the UL, the controller/processor 359 may provide demultiplexing between transport and logical channels, packet reassembly, deciphering, header decompression, and control signal processing to recover IP packets from the core network. The controller/processor 359 may also be responsible for error detection.

Similar to the functionality described in connection with the DL transmission by the base station 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370.

The controller/processor 375 can be associated with a memory 376 that stores program codes and data. The memory 376 may be referred to as a non-transitory computer-readable medium. In the UL, the controller/processor 375 may provide demultiplexing between transport and logical channels, packet reassembly, deciphering, header decompression, control signal processing to recover IP packets from the UE 350. IP packets from the controller/processor 375 may be provided to the core network. The controller/processor 375 may also be responsible for error detection.

In an aspect, the functionality of the transmit processor 316 and the receive processor 370 may be incorporated into the controller/processor 375, and similarly, the functionality of the transmit processor 368 and the receive processor 356 may be incorporated into the controller/processor 359. In an aspect, the controller/processor 359 may communicate with an application processor or sensor core (not shown) of the UE 350. The application processor may indicate the positioning type or simply request that the controller/processor 359 perform positioning. The controller/processor 359 may then provide the position estimate (absolute or relative) to the application processor.

Figure 4:
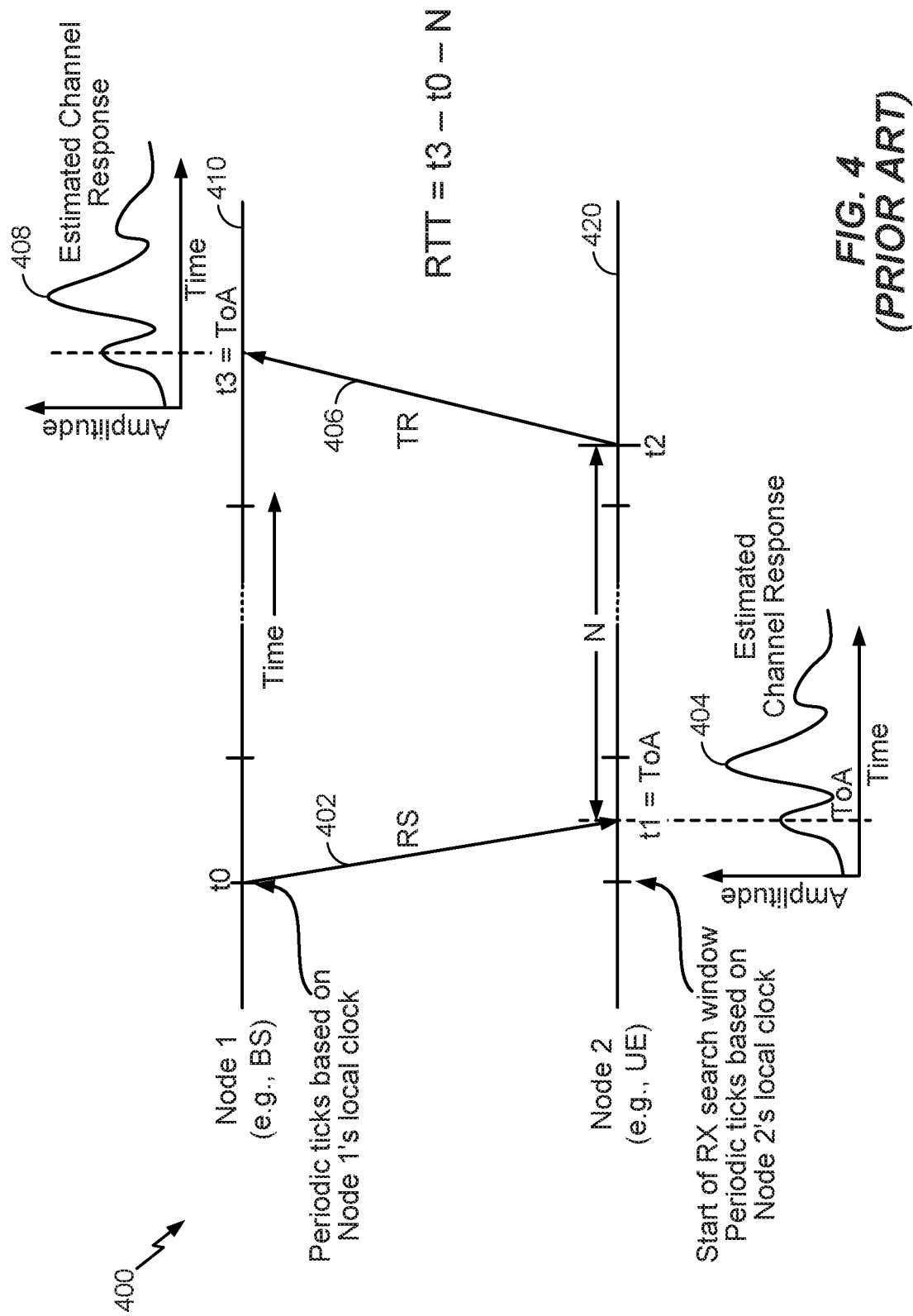
FIG. 4 illustrates a conventional process for estimating RTT between two nodes.

With reference now to FIG. 4, a conventional process 400 for estimating the RTT between two nodes is shown. A first node, Node 1, and a second node, Node 2, are shown for illustrative purposes. The RTT between Node 1 and Node 2 is the time taken for a first signal originating from Node 1 to travel to Node 2, and for a second signal in response to the first signal to be returned to Node 1 from Node 2 (a processing time delay that may be incurred at Node 2 is subtracted from the RTT). While Node 1 and Node 2 may be any wireless communication devices, for the sake of elucidation, Node 1 will be described as a base station (BS) and Node 2 will be described as a UE in the following description.

Considering process 400 in more detail, timelines 410 and 420 are respectively shown for Node 1 and Node 2. Timeline 410 shows example periodic ticks based on Node 1's local clock to provide an example duration for the sequence of events that will be discussed herein. Similarly, timeline 420 shows periodic ticks based on Node 2's local clock. The ticks illustrated in timelines 410 and 420 are not drawn to scale and do not necessarily convey any actual time durations.

Accordingly, at an initial time, or time t0, shown in timeline 410 of Node 1 (e.g., a base station), Node 1 may transmit a DL signal shown as RS 402 ("RS" may be a reference signal such as a synchronization signal block (SSB) or a channel state information reference signal (CSI-RS) in the DL). Node 2 is shown to receive RS 402 at a first time, time t1, shown on Node 2's timeline 420. Node 2 estimates the ToA of RS 402 at Node 2, based, for example, on estimating the RF channel response over time at Node 2. The estimated channel response 404 shows, for example, the amplitude of the signal RS 402 received at Node 2 over a period of time. The estimated channel response 404 includes one or more peaks, which are also referred to as channel taps. The ToA of RS 402 is estimated based on the time at which the first channel tap is detected, e.g., at or around the first peak of the estimated channel response 404. However, as shown in FIG. 4, the first channel tap at which the ToA is estimated (at time t1) may not be the strongest channel tap (i.e., the channel tap with the highest amplitude or highest energy), and the energy of subsequent channel taps remains unused in the ToA estimation. Furthermore, in the case of bandlimited signals transmitted over the channels, there may be high side lobes around a strong channel tap, which can also interfere with ToA estimation. For example, the side lobes of the subsequent channel taps after the first channel tap may cause errors in accurate ToA estimation based on the first channel tap.

The above-mentioned problems may be further exacerbated when Node 1 receives a response signal from Node 2 (which will be discussed in further detail below) when Node 1 is a base station and Node 2 is a UE. For example, the DL signal RS 402 is likely to be stronger and thus enable a more accurate ToA estimation, in comparison with a potentially weaker response signal sent from the UE to the base station. In general, the detection of signals (including timing response signals for RTT estimation) from the UE to the base station, and more specifically, detection of timing statistics such as the ToA at the base station, is difficult because of the weaker UL signals sent from the UE to the base station. This generally leads to the UE having to transmit the UL signals over a longer duration (at the weaker power) to improve the detectability at the base station, leading to higher overall power consumption and resource usage, while also suffering from lower estimation accuracies of the timing statistics at the base station.

Continuing with the explanation of process 400, upon estimation of the ToA of RS 402 at Node 2 at time t1, Node 2 incurs a processing delay before which a response is sent. For consistency, Node 2 waits a predetermined or pre-specified delay, shown as "N," before transmitting a response signal (illustrated as timing response (TR) 406) at a second time, time t2. TR 406 may be a random access channel (RACH) preamble or sounding reference signal (SRS), for example. The transmission time t2 of TR 406 from Node 2 (e.g., the time at which transmission starts) may be a pre-specified delay N after time t1. The delay N may be predefined (e.g., based on the standard of communication) and known in advance to both Node 1 and Node 2.

Node 1 receives TR 406 and estimates the ToA of TR 406 in a similar manner as described above for ToA estimation at Node 2. Specifically, the estimated channel response 408 at Node 1 provides the energy profile of the received signal at Node 1. The ToA of TR 406, corresponding to the first channel tap in the estimated channel response 408 is shown as a third time, time t3, on timeline 410. Node 1 then determines the RTT by the following estimation.

Since Node 1 knows the time of transmission of RS 402 (time t0), the ToA of TR 406 (time t3), and the pre-specified delay N, Node 1 estimates the RTT as the ToA of TR 406 minus the time of transmission of RS 402 minus the predetermined delay N, or RTT=t3−t0−N.

However, as will be appreciated, errors in the ToA estimate of TR 406 can lead to errors in the RTT estimation discussed above. As previously discussed, the ToA estimation at Node 1, if Node 1 is a base station, is likely to be higher because of the weaker UL signal TR 406 transmitted from Node 2 when Node 2 is a UE. In non-line of sight (NLOS) arrangements between Node 1 and Node 2, the errors are likely to be higher because the signal strength of RS 402, and more importantly of TR 406, is likely to be even weaker than in the line of sight (LOS) case. As also previously noted, an accurate RTT estimation is beneficial in many applications (e.g., positioning, and ranging applications) and there is a need to minimize or eliminate such errors. Thus, in order to improve RTT estimation, ToA estimation at Node 1 may be improved according to the exemplary aspects discussed in the following sections.

In order to minimize the impact of ToA estimation errors in RTT estimation, a timing statistic other than ToA may be derived from the estimated channel responses of the signals received at the respective nodes. For instance, a timing statistic such as the mean excess delay (MED) or the strongest channel tap (not necessarily the first channel tap) may be used, as will be discussed herein.

Figure 5:
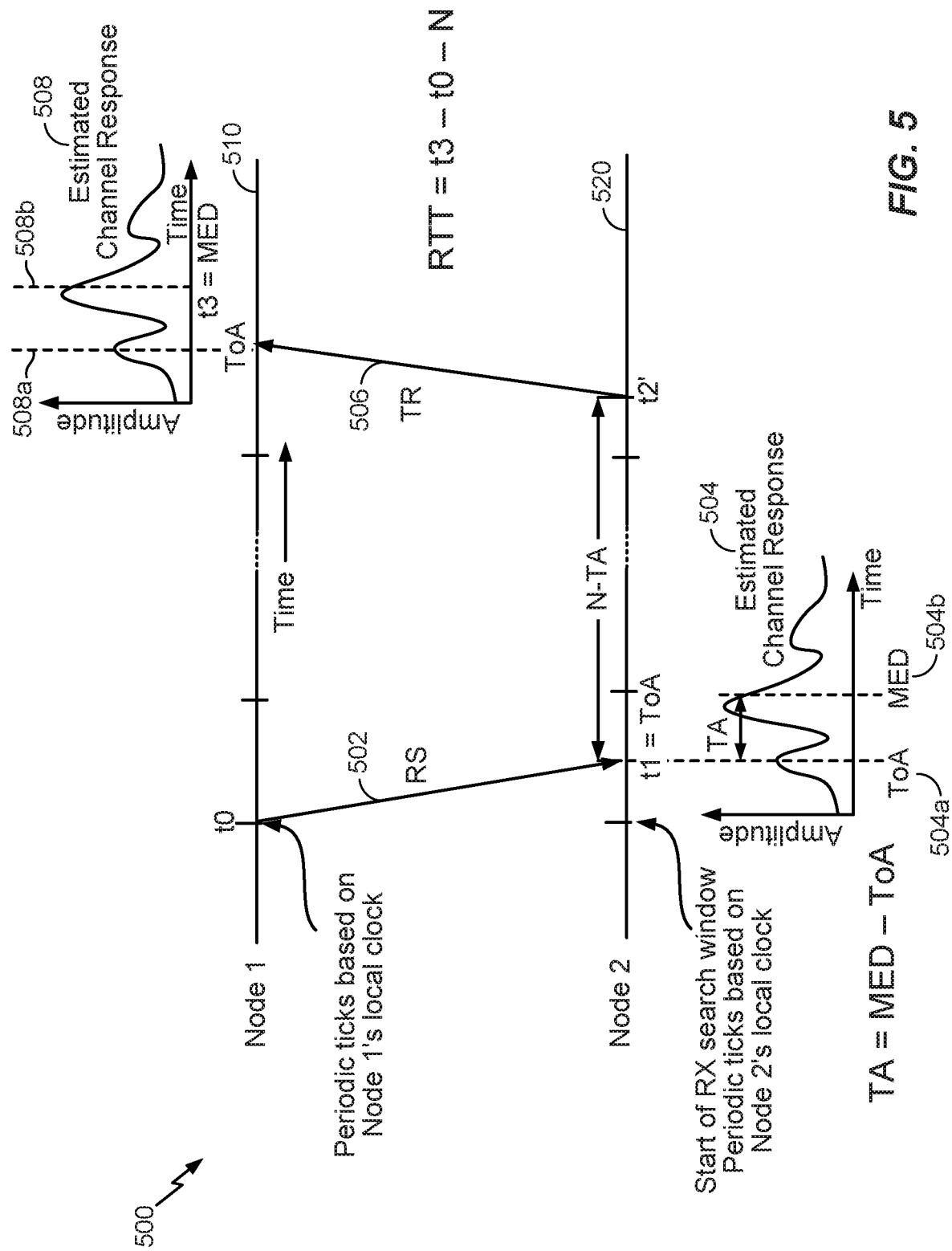
FIG. 5 illustrates an exemplary process for estimating RTT between two nodes, according to aspects of this disclosure.

Referring now to FIG. 5, a process 500 for RTT estimation according to exemplary aspects is shown. Once again, Node 1 and Node 2 are generally illustrated as wireless communication devices, which in the specifically discussed examples, may respectively be a base station and a UE, such as exemplary base station 310 and UE 350 of FIG. 3.

Considering process 500 in more detail, timelines 510 and 520 are respectively shown for Node 1 and Node 2. Timeline 510 shows example periodic ticks based on Node 1's local clock to provide an example duration for the sequence of events that will be discussed herein. Similarly, timeline 520 shows periodic ticks based on Node 2's local clock. As in FIG. 4, the ticks illustrated in timelines 510 and 520 are not drawn to scale and do not necessarily convey any actual time durations.

Accordingly, at an initial time, time t0, shown in timeline 510 of Node 1 (e.g., base station 310), Node 1 may transmit a DL signal shown as RS 502 (where RS 502 may be a reference signal such as an SSB or a CSI-RS in the DL). It is noted herein that the transmission by Node 1 may be performed using transceiver circuitry that may be integrated in separate transmitter and receiver circuitry, such as in transmitter 318a and receiver 318b, respectively. Node 2 (e.g., UE 350) is shown to receive RS 502 at a first time, time t1, shown on Node 2's timeline 520. Node 2 may also comprise separate transceiver circuitry for receiving RS 502, and the transceiver circuitry of Node 2 may also be integrated in separate transmitter and receiver circuitry, such as in transmitter 354b and receiver 354a, respectively. Node 2 then estimates (e.g., using processor circuitry, such as RX processor 356 and/or one or more other processors of UE 350) the ToA of RS 402 at Node 2, based, for example, on estimating the channel response at Node 2 (illustrated as the first estimated channel response 504) and detecting the first channel tap in the first estimated channel response 504. The time t1 of the first channel tap is also designated with the reference numeral 504a in FIG. 5. The first channel tap may be the earliest channel tap in a sequence of channel taps in first estimated channel response 504.

Departing from the conventional process 400, in process 500, Node 2 estimates additional timing statistics, such as the MED, in the first estimated channel response 504 (e.g., by means of processor circuitry incorporated in one or more of channel estimator 358, controller/processor 359, or other circuitry in UE 350). It is much easier for a receiving node to calculate the MED from an estimated channel response than the ToA. The MED may be defined as a first moment of the power delay profile, or a weighted average delay of the channel response. The power delay profile gives the intensity of a signal received through a multipath channel as a function of time delay. In an aspect, the weight used for the weighted average delay may be the squared amplitude of the channel response. The MED is designated by the reference numeral 504b in the first estimated channel response 504. It is recognized that the first estimated channel response 504 depicts a typical scenario in which multiple channel taps may be detected, with the first channel tap corresponding to the ToA 504a, and MED 504b being distinct from the first channel tap. If the MED 504b coincides with the first channel tap (e.g., if there is a single channel tap in the channel response), then the exemplary process 500 may appear similar to the conventional process 400 and the ToA estimate at Node 2 may be the only timing statistic needed for RTT estimation. Accordingly, the following discussion of process 500 focuses on the more likely/typical scenario in which the MED 504b differs from the ToA 504a.

With continued reference to FIG. 5, Node 2 also determines or estimates a timing advance (TA) as the difference between the MED 504b and the ToA 504a, i.e., TA=MED−ToA as shown in FIG. 5. The TA may be calculated by the controller/processor 359 of FIG. 3 if Node 2 is UE 350, for example. Node 2 then applies this timing advance TA to shorten the pre-specified delay N before the transmission of the response signal, timing response (TR) 406, at a second time, time t2', on timeline 520. The transmission of the response signal TR 406 may be performed using transceiver circuitry that may be incorporated in separate transmitter and receiver circuitry, such as transmitter 354b and receiver 354a. The time t2' on timeline 520 is advanced by an amount of the TA from the second time t2 shown on timeline 420 of FIG. 4, or in other words, time t2' occurs after a time delay of N−TA after time t1 (i.e., the ToA 504a of RS 502 at Node 2).

In an aspect, the TR 506 may be a RACH preamble or an SRS, for example. Thus, the transmission time t2' of the TR 506 from Node 2 (e.g., time at which transmission starts) may be the pre-specified delay N minus the timing advance TA (i.e., N−TA) after time t1. The delay N may be predefined (e.g., based on the standard of communication) and known in advance to both Node 1 and Node 2.

Further departing from process 400, in process 500, when Node 1 receives the TR 406, Node 1 estimates a second timing statistic, MED 508b, in a second estimated channel response 508 related to the TR 506. In an aspect, Node 1 may receive the TR 406 via transceiver circuitry incorporated in transmitter 318a and receiver 318b, and estimate the MED 508b using, for example, any combination of RX processor 370, channel estimator 374, and/or controller/processor 375 of base station 310.

Node 1 need not estimate the ToA of TR 506. The channel is assumed to be substantially invariant between the time t0 at which the RS 502 was transmitted from Node 1 and the time at which the TR 506 was transmitted in response from Node 2, which is typical in RTT estimation because of the relatively small duration N between these two signal transmissions. This means that the first and second estimated channel responses 504 and 508 are likely to be substantially similar, or even identical. In turn, it is recognized that the difference between the MED 508b and the ToA 508a at which the first channel tap occurs in the second estimated channel response 508 at Node 1 is likely to be substantially the same as the timing advance TA calculated at Node 2 (i.e., the difference between the ToA 504a and the MED 504b). With this recognition, Node 1 is configured in exemplary aspects to estimate the time at which the MED 508b occurs instead of the ToA 508a. This time instance corresponding to the MED 508b is referred to as the third time, time t3. Time t3 in FIG. 5 effectively coincides with time t3 shown in timeline 410 of FIG. 4 because changing the transmission time (t2') of TR 506 by the amount of TA is offset by using the MED 508b, which occurs the same or substantially the same amount of time (i.e., TA) after the ToA 508a of TR 506 at Node 2.

Accordingly, since Node 1 knows the time of transmission of RS 502 (time t0), the time of MED 508b of TR 506 (time t3), and the pre-specified delay N, Node 1 can estimate the RTT as RTT=t3−t0−N. However, the RTT estimation in this case is more accurate than that shown in process 400 of FIG. 4 because the timing statistic MED 508b can be estimated with greater accuracy at Node 2. Node 2 need not estimate the first timing statistic, ToA of TR 506 in this case, and thus avoids the potential errors associated with ToA estimation discussed above.

Although not described in detail herein, it is recognized that timing statistics of the estimated channel responses other than the MED, such as the strongest channel tap, may also be used in alternative aspects. In such alternative aspects, the above description of exemplary aspects may be generally applicable by replacing references to the MED with the strongest channel tap in the respective channel responses.

It is noted herein that the above-disclosed exemplary process 500 is applicable to RTT estimation without regard to the specific type of signals that RS 502 and TR 506 represent. For instance, these signals may or may not be beamforming signals as discussed above, without departing from the scope of the exemplary aspects.

Moreover, the techniques discussed herein may also be used in determining the signal propagation time between two nodes, i.e., in determining either the propagation time of RS 502 from Node 1 to Node 2, and/or the propagation time of TR 506 from Node 2 to Node 1, as being the same and equal to half of the estimated RTT according to the disclosed aspects.

Furthermore, the RTT estimation discussed herein may be used in any application without restricting the scope of the disclosed aspects. For example, the RTT estimation may be used for positioning of Node 2 (when configured as a UE) based on RTT estimates from Node 2 to multiple other nodes of known locations for trilateration; or for positioning Node 2 based on using beamforming techniques and detecting angles of arrival/departure in addition to respective RTTs of signals beamed from multiple antennas of a same node.

The RTT estimates, according to this disclosure, may also be used to synchronize the timing of two nodes, e.g., where Node 2 is a relay node whose timing is to be synchronized with the timing of Node 1, which may be a donor base station. Accordingly, Node 1 and Node 2 are not restricted to being configured as a base station and a UE, respectively. Furthermore, even in configurations where one of the two nodes is a base station and the other is a UE, the RTT estimation may be initiated by the UE, rather than the base station as in the above-described examples. Thus, Node 1 may be the UE and Node 2 may be the base station without departing from the scope of this disclosure.

Figure 6:
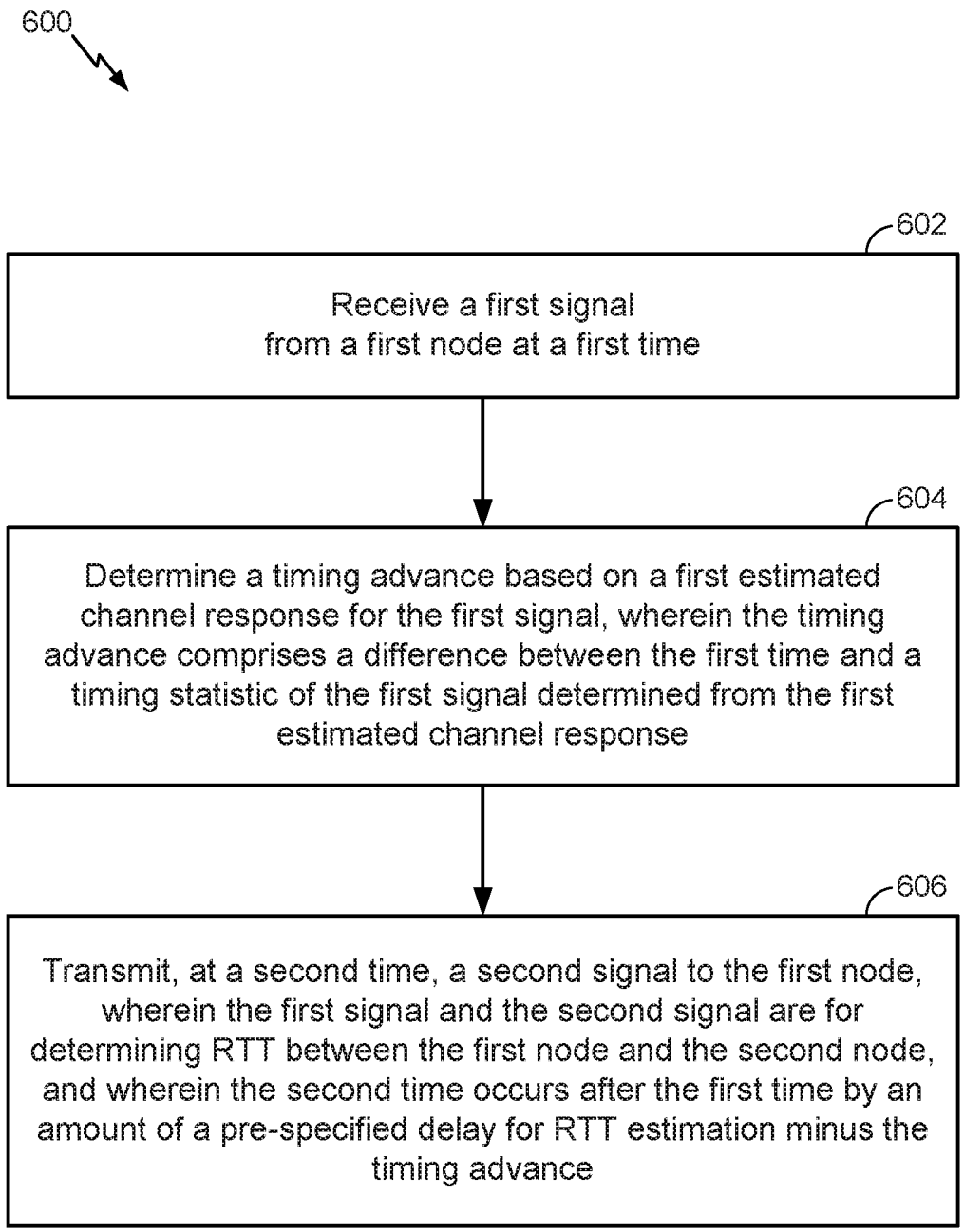
FIG. 6 illustrates a method of estimating RTT, performed by a second node such as a UE, in accordance with aspects of this disclosure.

It will be appreciated that exemplary aspects include various methods for performing the processes, functions and/or algorithms disclosed herein. For example, FIG. 6 illustrates a method 600 of determining an RTT between two nodes. Specifically, method 600 may be performed at the second node, e.g., Node 2, of FIG. 5. The second node may correspond to either of base station 310 or UE 350, or to two base stations 310, or even to two UEs 350.

At 602, the second node (e.g., antennas 320, receiver(s) 318, and/or RX processor 370, or antennas 352, receiver(s) 354, and/or RX processor 356) receives a first signal (e.g., RS 502) from a first node (e.g., Node 1) at a first time (e.g., time t1 in FIG. 5).

At 604, the second node (e.g., RX processor 370, TX processor 316, and/or controller/processor 375, or RX processor 356, TX processor 368, and/or controller/processor 359) determines a timing advance based on a first estimated channel response for the first signal (e.g., timing advance TA=MED 504b−ToA 504a from first estimated channel response 504). In an aspect, the timing advance may be a difference between the first time (e.g., ToA 504a) and a timing statistic (e.g., MED 504b) of the first signal calculated from the first estimated channel response.

At 606, the second node (e.g., antennas 320, transmitter(s) 318, and/or TX processor 316, or antennas 352, transmitter(s) 354, and/or TX processor 368) transmits, at a second time (e.g., time t2'), a second signal (e.g., TR 506) to the first node in response to reception of the first signal at 602. In an aspect, the first signal and the second signal are for determining RTT between the first node and the second node (e.g., reference signals and timing response signals). In an aspect, the second time occurs after the first time by an amount of a pre-specified delay for RTT estimation (e.g., N) minus the timing advance.

As discussed with reference to FIG. 5, the first time may correspond to a ToA (e.g., ToA 504a) of the first signal calculated from the first estimated channel response, and the timing advance may correspond to the mean excess delay (e.g., MED 504b) calculated from the first estimated channel response minus the ToA of the first signal. As previously noted, the MED of the first channel response may correspond to the average delay of the first channel response, weighted by the squared amplitude of the first channel response. The ToA may correspond to a first channel tap in the first estimated channel response, wherein the first channel tap may be the earliest channel tap in the first estimated channel response.

In an aspect, the method 600 may further include (not shown) receiving, at the second node, a measurement report from the first node, the measurement report including a transmission time (e.g., t0 in FIG. 5) of the first signal and a reception time (at the first node) of the second signal (e.g., t3 in FIG. 5).

Figure 7:
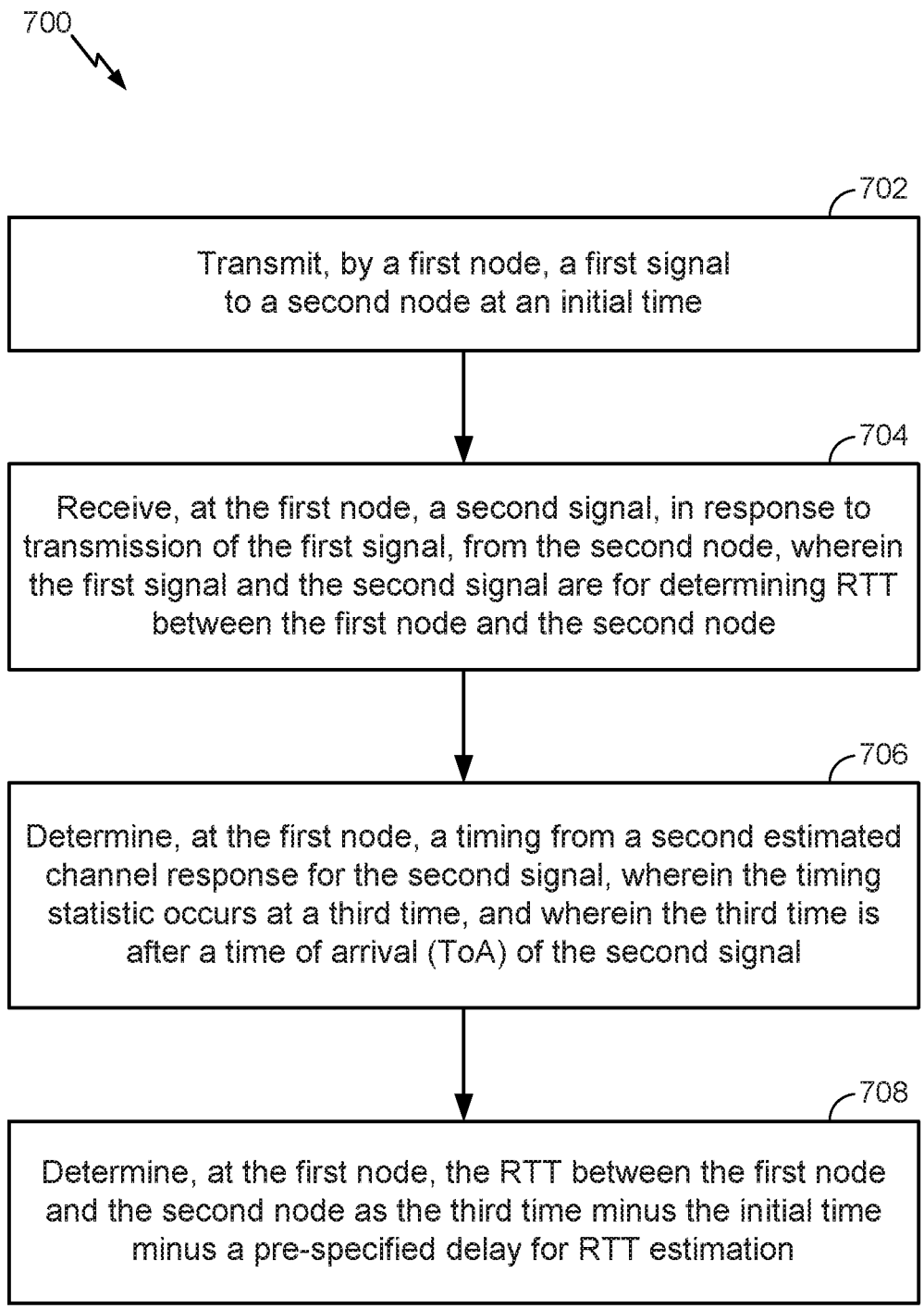
FIG. 7 illustrates a method of estimating RTT, performed by a first node such as a BS, in accordance with aspects of this disclosure.

FIG. 7 illustrates another method 700 of determining an RTT between two nodes. Specifically, method 700 may be performed at the first node, e.g., Node 1, of FIG. 5. The first node may correspond to either of base station 310 or UE 350, or to two base stations 310, or even to two UEs 350.

Accordingly, at 702, the first node (e.g., antennas 320, transmitter(s) 318, and/or TX processor 316, or antennas 352, transmitter(s) 354, and/or TX processor 368) transmits a first signal (e.g., RS 502) to a second node (e.g., Node 2) at an initial time (e.g., time t0).

At 704, the first node (e.g., antennas 320, receiver(s) 318, and/or RX processor 370, or antennas 352, receiver(s) 354, and/or RX processor 356) receives a second signal (e.g., TR 506), in response to transmission of the first signal at 702, from the second node. In an aspect, the first signal and the second signal are for determining RTT between the first node and the second node (e.g., reference signals and timing response signals).

At 706, the first node (e.g., RX processor 370, TX processor 316, and/or controller/processor 375, or RX processor 356, TX processor 368, and/or controller/processor 359) determines a timing statistic (e.g., MED 508b) from a second estimated channel response for the second signal (e.g., second estimated channel response 508), wherein the timing statistic occurs at a third time (e.g., time t3).

At 708, the first node (e.g., RX processor 370, TX processor 316, and/or controller/processor 375, or RX processor 356, TX processor 368, and/or controller/processor 359) determines the RTT as the third time minus the initial time minus a pre-specified delay for RTT estimation (e.g., RTT=T3−T0−N).

As discussed with reference to FIG. 5, the ToA of the second signal at the first node (e.g., ToA 508a) is in advance of the third time by a timing advance (TA), the timing advance applied to the second signal by the second node. Although the ToA of the second signal at the first node need not be specifically/explicitly estimated by the first node, ToA 508a may correspond to a first channel tap in the second estimated channel response, wherein the first channel tap is an earliest channel tap in the second estimated channel response. The MED of the second channel response may correspond to the average delay of the second channel response, weighted by the squared amplitude of the second channel response.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of non-transitory computer-readable medium known in the art.

An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes compact disc (CD), laser disc, optical disc, digital video disc (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of determining a round trip time (RTT) between a first node and a second node, the method comprising:
  receiving, by the second node, a first signal from the first node at a first time;
  determining, by the second node, a timing advance based on a first estimated channel response for the first signal, wherein the timing advance comprises a difference between the first time and a timing statistic of the first signal determined from the first estimated channel response; and transmitting, by the second node, at a second time, a second signal to the first node, wherein the first signal and the second signal are for determining the RTT between the first node and the second node, and wherein the second time occurs after the first time by an amount of a pre-specified delay for RTT estimation minus the timing advance.

2. The method of claim 1, wherein the first time corresponds to a time of arrival (ToA) of the first signal calculated from the first estimated channel response, and the timing statistic comprises a mean excess delay (MED) of the first estimated channel response.

3. The method of claim 2, wherein the MED of the first estimated channel response corresponds to the average delay of the first estimated channel response, weighted by a squared amplitude of the first estimated channel response.

4. The method of claim 3, wherein the ToA corresponds to a first channel tap or an earliest channel tap in the first estimated channel response.

5. The method of claim 2, wherein the timing advance is greater than zero.

6. The method of claim 1, further comprising:
receiving, at the second node, a measurement report from the first node, the measurement report including a transmission time of the first signal and a reception time of the second signal.

7. The method of claim 1, wherein the first node is a base station (BS) and the second node is a user equipment (UE).

8. The method of claim 7, wherein the first signal comprises a reference signal (RS) and the second signal comprises a timing response (TR).

9. The method of claim 1, wherein the first node is a user equipment (UE) and the second node is a base station (BS).

10. An apparatus for determining a round trip time (RTT) between a first node and a second node, comprising:

transceiver circuitry of the second node configured to receive a first signal from the first node at a first time; and processor circuitry of the second node in communication with the transceiver circuitry, wherein the processor circuitry is configured to:
determine a timing advance based on a first estimated channel response for the first signal, wherein the timing advance comprises a difference between the first time and a timing statistic of the first signal determined from the first estimated channel response; and
cause the transceiver circuitry to transmit, at a second time, a second signal to the first node, wherein the first signal and the second signal are for determining the RTT between the first node and the second node, and wherein the second time occurs after the first time by an amount of a pre-specified delay for RTT estimation minus the timing advance.

11. The apparatus of claim 10, wherein the first time corresponds to a time of arrival (ToA) of the first signal calculated from the first estimated channel response, and the timing statistic comprises a mean excess delay (MED) calculated from the first estimated channel response.

12. The apparatus of claim 11, wherein the MED of the first estimated channel response corresponds to the average delay of the first estimated channel response, weighted by a squared amplitude of the first estimated channel response.

13. The apparatus of claim 12, wherein the ToA corresponds to a first channel tap or an earliest channel tap in the first estimated channel response.

14. The apparatus of claim 11, wherein the first node is a base station (BS) and the second node is a user equipment (UE).

15. The apparatus of claim 11, wherein the first node is a user equipment (UE) and the second node is a base station (BS).

* * * * *